Patented Oct. 22, 1935

2,017,995

UNITED STATES PATENT OFFICE 2,017,995

USE OF SULPHONATED ORGANIC COMPOUNDS

Edmund Stanley, Henry Charles Olpin, and George Holland Ellis, Spondon, near Derby, England, assignors to Celanese Corporation of America, a corporation of Delaware No Drawing. Application November 3, 1930, Serial No. 493,224. In Great Britain December 10, 1929

16 Claims. (Cl. 8—5)

This invention relates to new products particularly applicable as dispersing or emulsifying agents, more especially for the production of finely divided suspensions or dispersions of insoluble or difficultly soluble dyestuffs, and to the preparation of such dispersions and to the dyeing, printing, stencilling or otherwise colouring therewith of materials made of or containing cellulose esters or cellulose ethers.

The new products of the present invention are obtained by effecting reaction between naphthalene or other aromatic compound, carbocyclic or heterocyclic, and an aliphatic saturated or unsaturated higher alcohol and sulphonating the products if they do not already contain sulphonic groups, or if they contain a proportion of sulphonic acid groups insufficient to give them the desired solubility. For the purpose of this specification, "higher alcohol" may be taken to mean an alcohol containing not less than eight carbon atoms.

We have found these new products to be greatly superior as dispersing agents to water soluble sulphonated compounds obtainable from naphthalene or other aromatic compounds and the lower alcohols. They also possess wetting properties.

The reaction between the aromatic compound and the higher alcohol may be effected in various ways. For example, the reaction may be carried out in the presence of condensing agents such as chlor-sulphonic, fuming sulphuric and concentrated sulphuric acids. By using these condensing agents which are also sulphonating agents, simultaneous sulphonation may be effected. Alternatively, sulphonation may be brought about subsequently by the use of any suitable sulphonating agent, or the aromatic compound used may be already sulphonated.

Of aromatic compounds which may be used according to the invention, may be mentioned derivatives comprising a benzene or naphthalene nucleus linked to one or more alkyl, hydroxy, halogen or sulphonic acid groups; or unsubstituted hydrocarbons of the benzene and naphthalene series, especially naphthalene, which is of particular value.

Among the higher aliphatic alcohols which may be used, mention may be made of secondary octyl alcohol $CH_3CH(OH)(CH_2)_5CH_3$, normal octodecyl alcohol $CH_3(CH_2)_{17}OH$, ceryl alcohol $C_{26}H_{53}(OH)$, myricyl alcohol $C_{30}H_{61}OH$, normal dodecyl alcohol $C_{12}H_{25}OH$, and particularly of normal cetyl alcohol $C_{16}H_{33}.OH$.

The new products and their alkali salts are readily soluble in water.

The following example illustrates the production of sulphonated products according to this invention, but is not to be considered as in any way limiting the invention.

Example

A mixture of 128 parts of naphthalene and 242 parts cetyl alcohol is stirred at 70° C. while 200 parts of chlorsulphonic acid is run in slowly. When all the chlorsulphonic acid has been introduced, the temperature is raised to 100° C., and maintained there until no more fumes of hydrochloric acid are evolved. The product is diluted with a little water, neutralized with caustic soda solution and evaporated to dryness.

According to a further feature of the invention, insoluble or difficultly soluble substances, for example insoluble or difficultly soluble organic compounds, particularly colouring matters, are prepared in dispersed form by treating them with an agent comprising one or more of the aforesaid new products or salts thereof.

The dispersion may be effected, for example, by mixing or grinding the insoluble or difficultly soluble substance with the dispersing agent in the presence or absence of water or by forming, liberating or precipitating it in the presence of the dispersing agent, whereby solid, paste, or liquid preparations may be produced as required. The dispersing action may also be assisted by heating or by mechanical means. The aqueous preparations may if desired be treated for the removal of part or the whole of any water present by evaporation or otherwise. Other protective colloids may be added to the preparations in order to increase their stability or for other purposes.

In some cases, and particularly when dispersions of insoluble organic compounds, for example insoluble colouring matters, are required, the dispersing action may be assisted by the addition of an auxiliary substance capable of exerting a solvent action on the compound to be dispersed, for instance the auxiliary solvents specified in United States Patent No. 1,690,481 and United States application S. No. 152,517 filed 3rd December, 1926, in connection with the dispersion of insoluble or difficultly soluble colouring matters for cellulose acetate.

The new dispersing agents have the advantage of very good solubility and very good stability in the presence of acids or of calcium or other salts present in hard water.

Further, according to the invention, the colouration of materials made of or containing cellulose esters, for example cellulose acetate, or celluose ethers, is effected by a process comprising the application thereto by dyeing, printing, stencilling or otherwise, of insoluble or difficultly soluble organic compounds or colouring matters which have affinity for cellulose esters or ethers and which have been converted into finely dispersed form by the new process, namely, by treatment with an agent comprising one or more of the aforesaid new products.

Any insoluble or difficultly soluble colouring matter or organic compound having an affinity for the cellulose ester or ether material under treatment or capable of colouring the same may be utilized for the above purposes. In the case of colouring by the azoic or development process, the base may be applied first diazotized on the material and developed, or the developer component may be applied first and the colour formed by treatment with a suitable diazo-solution, or the base and developer components may be applied separately or together and the colour produced by subsequent diazotization on the material. Either the base or the developer, or both may be applied in the form of dispersions obtained with the aid of the new dispersing agents. As instances of suitable bodies may be mentioned the colouring matters or organic compounds or classes of colouring matters or compounds referred to in United States Patents Nos. 1,618,413, 1,545,819, 1,600,277, 1,641,965, 1,618,415, 1,694,414, and 1,679,935, and United States application S. No. 98,614, filed 30th March, 1926, colouring matters of United States application S. No. 287,646, filed 22nd June, 1928, containing one or more keto-acidyl groups and particularly aceto-acetyl groups, the nitro-diarylamines specified in United States applications S. Nos. 311,252 and 311,253, both filed 26th September, 1928, the unsulphonated thiazole derivatives of United States application S. No. 307,771, filed 22nd September, 1928, the azo dyes containing the xanthene or thioxanthene nucleus, of United States application S. No. 323,211, filed 1st December, 1928, and the azo dyes of United States application S. No. 297,098, filed 2nd August, 1928 containing the anthraquinone nucleus.

The process of the invention is broadly applicable to the colouration of materials made of or containing any cellulose esters such for example as cellulose formate, propionate, or butyrate, or the products obtained by the treatment of alkalized cellulose with esterifying agents (e. g. the product known as immunized cotton obtained by means of p-toluene-sulphochloride), or made of or containing any cellulose ethers such as methyl, ethyl or benzyl celluose, or the corresponding condensation products of cellulose and glycols or other polyhydric alcohols. When the processes of the present invention are applied to the dyeing or otherwise colouring of mixed materials comprising in addition to cellulose acetate or other cellulose esters or ethers, fibres such as silk, wool, or cotton or other cellulosic fibres, natural or artificial, the said other fibres may be dyed with other dyestuffs before, after or together with the cellulose ester or ether portion and in the same or contrasting shades according to the choice of dyestuffs made and the affinity of the respective fibres therefor.

What we claim and desire to secure by Letters Patent is:—

1. Process for the coloration of materials comprising organic substitution derivatives of cellulose, comprising applying thereto a relatively insoluble coloring compound in the form of an aqueous dispersion obtained with the aid of a sulphonated condensation product of a higher alcohol and a cyclic compound.

2. Process for the coloration of materials comprising cellulose acetate, comprising applying thereto a relatively insoluble coloring compound in the form of an aqueous dispersion obtained with the aid of a sulphonated condensation product of a higher alcohol and a compound selected from the group consisting of benzene, naphthalene, and their homologues and simple substitution derivatives.

3. Process for the coloration of materials comprising cellulose acetate, comprising applying thereto a relatively insoluble coloring compound in the form of an aqueous dispersion obtained with the aid of a water-soluble salt of the sulphonated condensation product of a higher aliphatic alcohol containing from 12 to 30 carbon atoms and a compound selected from the group consisting of benzene, naphthalene, and their homologues and simple substitution derivatives.

4. Process for the coloration of materials comprising organic substitution derivatives of cellulose, comprising applying thereto a relatively insoluble coloring compound in the form of an aqueous dispersion obtained with the aid of an alkali salt of a sulphonated condensation product of a higher fatty alcohol containing from 12 to 30 carbon atoms and a compound selected from the group consisting of benzene, naphthalene, and their homologues and simple substitution derivatives.

5. In a process for the coloration of materials comprising organic substitution derivatives of cellulose by the azoic process, the step of applying at least one of the coloring components in the form of an aqueous dispersion obtained with the aid of a sulphonated condensation product of naphthalene and normal cetyl alcohol.

6. In a process for the coloration of materials comprising cellulose acetate by the azoic process, the step of applying at least one of the coloring components in the form of an aqueous dispersion obtained with the aid of a sulphonated condensation product of naphthalene and normal cetyl alcohol.

7. In a process for the coloration of materials comprising cellulose acetate by the azoic process, applying at least one of the coloring components in the form of an aqueous dispersion obtained with the aid of a sulphonated condensation product of a higher fatty alcohol containing from 12 to 30 carbon atoms and a compound selected from the group consisting of benzene, naphthalene, and their homologues and simple substitution derivatives.

8. Process for the coloration of materials comprising organic substitution derivatives of cellulose, comprising applying thereto a relatively insoluble coloring compound in the form of an aqueous dispersion obtained with the aid of a sulphonated condensation product of a higher aliphatic alcohol containing from 12 to 30 carbon atoms with a compound of the naphthalene series.

9. Process for the coloration of material comprising organic substitution derivatives of cellulose, comprising applying thereto a relatively insoluble coloring compound in the form of an aqueous dispersion obtained with the aid of a water-soluble salt of a sulphonated condensation product of a higher fatty alcohol containing from 12 to 30 carbon atoms with a compound of the naphthalene series.

10. Process for the coloration of materials comprising organic substitution derivatives of cellulose, comprising applying thereto a relatively insoluble coloring compound in the form of an aqueous dispersion obtained with the aid of a sulphonated condensation product of a saturated higher aliphatic alcohol containing from 12 to 30 carbon atoms and a compound selected from the group consisting of benzene, naphthalene, and their homologues and substitution products.

11. Process for the coloration of materials containing organic derivatives of cellulose which comprises applying thereto a relatively insoluble coloring compound in the form of an aqueous dispersion obtained with the aid of a sulphonated condensation product of naphthalene and normal cetyl alcohol.

12. Process for the coloration of materials comprising cellulose acetate, comprising applying thereto a relatively insoluble coloring compound in the form of an aqueous dispersion obtained with the aid of a sulphonated condensation product of naphthalene and normal cetyl alcohol.

13. Process for the coloration of materials containing organic derivatives of cellulose which comprises applying thereto a relatively insoluble coloring compound in the form of an aqueous dispersion obtained with the aid of a water-soluble salt of a sulphonated condensation product of naphthalene and normal cetyl alcohol.

14. Process for the coloration of materials comprising cellulose acetate, comprising applying thereto a relatively insoluble coloring compound in the form of an aqueous dispersion obtained with the aid of a water-soluble salt of a sulphonated condensation product of naphthalene and normal cetyl alcohol.

15. Process for the coloration of materials comprising organic substitution derivatives of cellulose, which comprises applying thereto a relatively insoluble coloring compound in the form of an aqueous dispersion obtained with the aid of a sulphonated condensation product of an aliphatic alcohol containing from 12-30 carbon atoms and a compound selected from the group consisting of benzene, naphthalene and their homologues and simple substitution derivatives.

16. In a process for the coloration of materials comprising organic substitution derivatives of cellulose by the azoic process, the step of applying at least one of the coloring components in the form of an aqueous dispersion obtained with the aid of a sulphonated condensation product of a fatty alcohol containing from 12-30 carbon atoms and a compound selected from the group consisting of benzene, naphthalene and their homologues and simple substitution derivatives.

EDMUND STANLEY.
HENRY CHARLES OLPIN.
GEORGE HOLLAND ELLIS.